United States Patent

[11] 3,556,300

[72] Inventor Edward A. Codo
 Joliet, Ill.
[21] Appl. No. 856,043
[22] Filed Sept. 8, 1969
[45] Patented Jan. 19, 1971
[73] Assignee Caterpillar Tractor Co.
 Peoria, Ill.
 a corporation of California

[54] FILTER ELEMENT RETAINING MEANS
 3 Claims, 3 Drawing Figs.
[52] U.S. Cl. .................................................... 210/232,
 210/452
[51] Int. Cl. .................................................. B01d 27/00
[50] Field of Search ......................................... 210/236,
 232, 445, 451, 453, 442, 352, 452

[56] References Cited
 UNITED STATES PATENTS
 2,017,350 10/1935 Morgan ..................... 210/232X
 2,660,314 11/1953 Lasky ........................ 210/442
 2,718,310 9/1955 Trahan ..................... 210/232X Primary Examiner—Samih N. Zaharna
Attorney—Fryer, Tjensvold, Feix, Phillips and Lempio ABSTRACT: A filter comprising a filter housing and a filter assembly easily removable from the filter housing. The filter assembly comprises a tie rod carrying a cover, a spring, a cap, a filter element and a pin and retainer which cooperate to retain the filter element on the tie rod until the assembly is withdrawn from the housing, and then to release the filter element from the tie rod when the pin and retainer are manually aligned.

PATENTED JAN 19 1971 3,556,300

INVENTORS
EDWARD A. CODO

BY
ATTORNEYS

FILTER ELEMENT RETAINING MEANS

BACKGROUND OF THE INVENTION

This invention relates to the field of filters which typically comprise a filter housing containing a tie rod upon which is disposed a cover, spring, cap and filter element. One end of the tie rod is threaded into the interior of the housing, and the other end pulls the cover into sealing engagement with the housing. The spring is compressed between the cover and a cap engaging one end of the filter element, and urges the filter element into sealing engagement with a suitable seat formed in the interior of the housing.

Such filter assemblies are used to filter foreign particles from fluids, such as oils, in lubricating and hydraulic systems. The oil flows through the filter element, which is made of some porous material. This porous material traps unwanted foreign particles, but allows the oil to flow through with little drop in pressure. After the filter element is in use for some time, the porous material becomes partially clogged by the foreign particles that it has trapped, and the performances of the filter diminishes. At this time it is customary to dispose of the filter element and replace it with a new one. Accordingly, a change of filter elements is included in the routine maintenance of almost all machines which include hydraulic systems.

As a practical matter, it has been found that it is difficult to remove the filter element from the filter housing without the use of some kind of a tool to engage the filter element and withdraw it from the housing. It has been found that the simplest and most convenient tool that can be employed in this operation is the tie rod itself. This is done by employing some means of retaining the filter element on the tie rod so that when the tie rod is withdrawn from the filter housing, the filter element is withdrawn along with it.

In the past, snap rings have been employed to retain the filter element on the tie rod. However, this has the disadvantage of requiring a tool for removing the snap ring from the tie rod once the tie rod and filter element have been withdrawn from the filter housing. Also, the snap ring often breaks while in service, and the broken pieces enter the hydraulic system, causing extensive damage.

Accordingly, it is an object of this invention to provide a means of removing a filter element from a filter housing without requiring any tools other than the tie rod of the filter assembly itself.

It is a further object of this invention to employ the tie rod of the filter assembly as a tool in removing the filter element from the housing in such a way that no other tools will be required to replace the filter element once the tie rod and filter element have been removed from the housing.

A further object of this invention is to provide a means of retaining a filter element on a tie rod, which will not break or become loose and enter the hydraulic system in which it is being used.

Another object of this invention is to provide a filter element retaining means which will be very inexpensive to make and employ in a filter assembly.

Further objects and advantages of the invention and the manner in which it is carried into practice will become apparent upon reading the following specification, wherein reference is made to the accompanying drawings.

Figure 1:
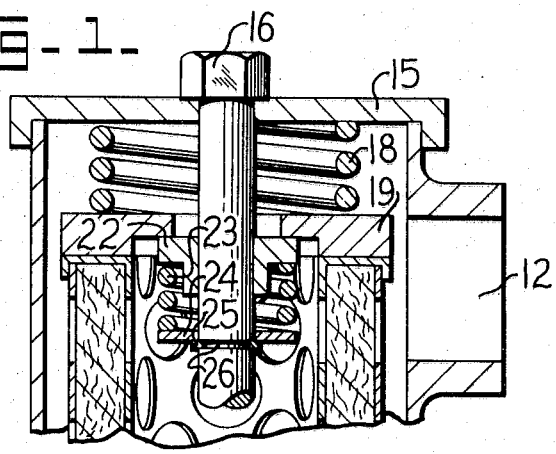
FIG. 1 is a cross section of a filter embodying the present invention.

In FIG. 1 a filter is shown as comprising a housing 11, having an inlet 12 and an outlet 13, a filter element 14 disposed within the housing, and a cover 15 secured to the housing by a tie rod 16 which extends along the axis of the assembly and is threaded into the housing at 17. A spring 18 is compressed between cover 15 and a cap 19 which engages the filter element and urges it towards sealing engagement with a retainer 20 carried slidably on the tie rod. The retainer is in turn urged towards sealing engagement with a suitable seat 21 formed in the interior of the filter housing. Thus, fluid entering the filter through inlet 12 is normally prevented from bypassing the filter element. It must flow through the element before leaving the filter through outlet 13.

A bypass safety valve 22 is normally held closed against a seat on cap 19 by a spring 23 compressed between the valve and washer 24 which is retained by snap ring 25 disposed in a groove 26 in tie rod 16. If the filter element becomes so clogged as to cause a significant drop in pressure of oil on the downstream side, valve 22 will open and allow unfiltered oil to be supplied to the system at normal pressure.

Valve 22 also serves to retain cap 19, spring 18 and cover 15 on tie rod 16 when the filter element is removed.

A cotter pin 27, having a head 28 and prongs 29 spread in the conventional manner, is disposed rotatably in a hole in tie rod 16 which is a slight distance below retainer 20 when the filter assembly is disposed in housing 11.

Figure 3:
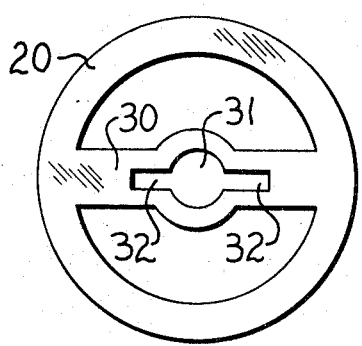
FIG. 3 is a plan view of a retainer used in association with the pin.

As shown in FIG. 3, retainer 20 is a flat annular ring having a diametric bridge, 30, at the center of which is a circular hole 31, the perimeter of which includes diametrically opposed slots 32.

Figure 2:
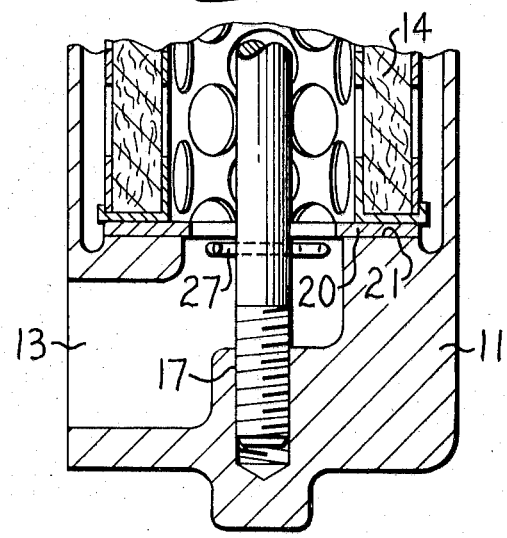
FIG. 2 is a fragmentary view of a filter assembly tie rod having a retaining pin near one end.
Figure 2:
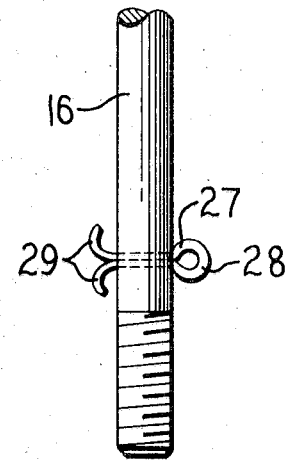

This configuration causes retainer 20 to stop against the cotter pin in the position shown in FIG. 1, when the assembly is withdrawn from the housing; but permits it to pass over the pin when the pin is rotated 90° to the position shown in FIG. 2.

When the tie rod is fully screwed into housing 11, pin 27 will be positioned some distance below retainer 20. If this distance is great enough, pin 27 will be free to rotate about its axis. As tie rod 16 is unscrewed from the housing, pin 27 will move upward with respect to retainer 20, and will also rotate with the tie rod when the tie rod is being unscrewed. If pin 27 is in the position shown in FIG. 2, the upper prong will strike bridge 30 of retainer 20 as the pin rotates around the axis of the tie rod and moves toward the retainer. Upon contacting bridge 30, the pin will then rotate about its own axis to the position shown in FIG. 1.

To change the filter element, the tie rod is unscrewed from the housing and withdrawn. The filter element is retained on the tie rod when it is withdrawn, by retainer 20, which slides downward and engages pin 27. The retainer cannot slip past pin 27 because it will not allow the pin to assume the alignment required to pass through hole 31 and slots 32.

Once the assembly is withdrawn from the housing, the mechanic merely pushes the retainer up along the tie rod against the force of spring 18; aligns pin 27 with the axis of the tie rod; aligns slots 32 with pin 27; and slips the retainer past pin 27 and off the end of tie rod. The filter element may then be freely removed from the tie rod. The rest of the assembly is retained on the tie rod by snap ring 23. To install a new element the foregoing steps are reversed.

I claim:

1. A filter comprising a housing including an inlet and an outlet means, a cover for the housing, a filter assembly adapted to remove foreign particles from a fluid, disposed in the housing intermediate the inlet and outlet means whereby fluid entering the inlet means flows through the filter assembly and out the outlet means, a tie rod extending through the cover and through the housing and having threaded engagement with the interior of the housing to hold the cover and filter assembly in operative position with respect to the housing, resilient means urging the assembly inwardly of the tie rod, and removable means acting between the tie rod and the assembly to retain the assembly on the tie rod when the rod is removed from the housing, said removable means comprising a flat annular retainer disposed on the tie rod inwardly of the filter assembly and having slots formed in its inner diameter, and a pin disposed rotatably in the tie rod inwardly of the retainer and having alternatively a greater and lesser profile as the pin is rotated 90° about its axis so that the lesser profile of the pin will pass through the slots in the retainer, but the greater profile will not.

2. The filter of claim 1 wherein the pin is a cotter pin having its ends spread in the same plane.

3. The filter of claim 1 wherein the retainer has means adjacent the slots which will engage and rotate the pin 90° about its axis if its lesser profile is aligned with the slots as the tie rod is unscrewed.